United States Patent
Selvadurai et al.

(10) Patent No.: US 11,341,517 B2
(45) Date of Patent: May 24, 2022

(54) INDEXING ENTITIES BASED ON PERFORMANCE METRICS

(71) Applicant: ITERATE STUDIO, INC., Denver, CO (US)

(72) Inventors: John Selvadurai, San Jose, CA (US); Jon C. Nordmark, Littleton, CO (US); Frederick Michael Frazzini, Aurora, CO (US)

(73) Assignee: ITERATE STUDIO, INC., Denver, CO (US)

( * ) Notice: Subject to any disclaimer, the term of this patent is extended or adjusted under 35 U.S.C. 154(b) by 0 days.

(21) Appl. No.: 17/024,495

(22) Filed: Sep. 17, 2020

(65) Prior Publication Data

US 2021/0081965 A1 Mar. 18, 2021

Related U.S. Application Data

(60) Provisional application No. 62/902,280, filed on Sep. 18, 2019.

(51) Int. Cl.

| | |
|---|---|
| *G06Q 10/00* | (2012.01) |
| *G06Q 30/02* | (2012.01) |
| *G06Q 40/00* | (2012.01) |
| *G06Q 10/10* | (2012.01) |
| *G06Q 10/06* | (2012.01) |
| *G06N 20/00* | (2019.01) |
| *G06Q 40/06* | (2012.01) |

(52) U.S. Cl.
CPC ......... *G06Q 30/0201* (2013.01); *G06N 20/00* (2019.01); *G06Q 10/0635* (2013.01); *G06Q 10/06375* (2013.01); *G06Q 10/06393* (2013.01); *G06Q 10/06398* (2013.01); *G06Q 10/105* (2013.01); *G06Q 40/06* (2013.01); *G06Q 40/12* (2013.12)

(58) Field of Classification Search
None
See application file for complete search history.

(56) References Cited

U.S. PATENT DOCUMENTS

| | | | |
|---|---|---|---|
| 10,614,363 B2 * | 4/2020 | Libert | G06F 16/2465 |
| 2004/0068431 A1 * | 4/2004 | Smith | G06Q 10/06375 |
| | | | 705/7.14 |

(Continued)

OTHER PUBLICATIONS

Rajkomar, Alvin, Ensuring Fairness in Machine Learning to Advance Health Equity, 2018, NCBI, https://www.ncbi.nlm.nih.gov/pmc/articles/PMC6594166/, p. 1-14. (Year: 2018).*

*Primary Examiner* — Joseph M Waesco
(74) *Attorney, Agent, or Firm* — Dorsey & Whitney LLP

(57) ABSTRACT

A method of comparing performance of a first entity and a second entity uses performance indexing based on comparable performance metrics. A first entity performance rate and a first growth ability for the first entity are determined based on a first plurality of entity characteristics for the first entity. The first performance rate and the first growth ability are weighted based of the first plurality of entity characteristics and a first entity index value is determined based on the weighted first performance rate and first growth ability. A comparison between the first entity and the second entity is generated using the first entity index value and a second entity index value for the second entity.

18 Claims, 8 Drawing Sheets

(56) References Cited

U.S. PATENT DOCUMENTS

| | | | |
|---|---|---|---|
| 2013/0317954 A1* | 11/2013 | Psota | G06Q 40/02 |
| | | | 705/30 |
| 2014/0297563 A1* | 10/2014 | Jhunjhunwala | G06Q 40/02 |
| | | | 705/36 R |
| 2015/0039531 A1* | 2/2015 | Dayani, Sr | G06Q 40/06 |
| | | | 705/36 R |
| 2015/0073929 A1* | 3/2015 | Psota | G06Q 30/0605 |
| | | | 705/26.2 |
| 2015/0095105 A1* | 4/2015 | Fitts | G06Q 10/067 |
| | | | 705/7.29 |
| 2015/0269512 A1* | 9/2015 | Wartel | G06Q 10/06393 |
| | | | 705/7.39 |
| 2015/0287051 A1* | 10/2015 | Baig | G06Q 30/0201 |
| | | | 705/7.29 |
| 2016/0260044 A1* | 9/2016 | Sabet | G06Q 10/06398 |
| 2017/0024678 A1* | 1/2017 | Sodani | G06Q 10/06398 |
| 2019/0102710 A1* | 4/2019 | Predescu | G06F 16/335 |
| 2020/0160442 A1* | 5/2020 | Pathak | G06Q 10/06393 |
| 2021/0081965 A1* | 3/2021 | Selvadurai | G06Q 30/0201 |

\* cited by examiner

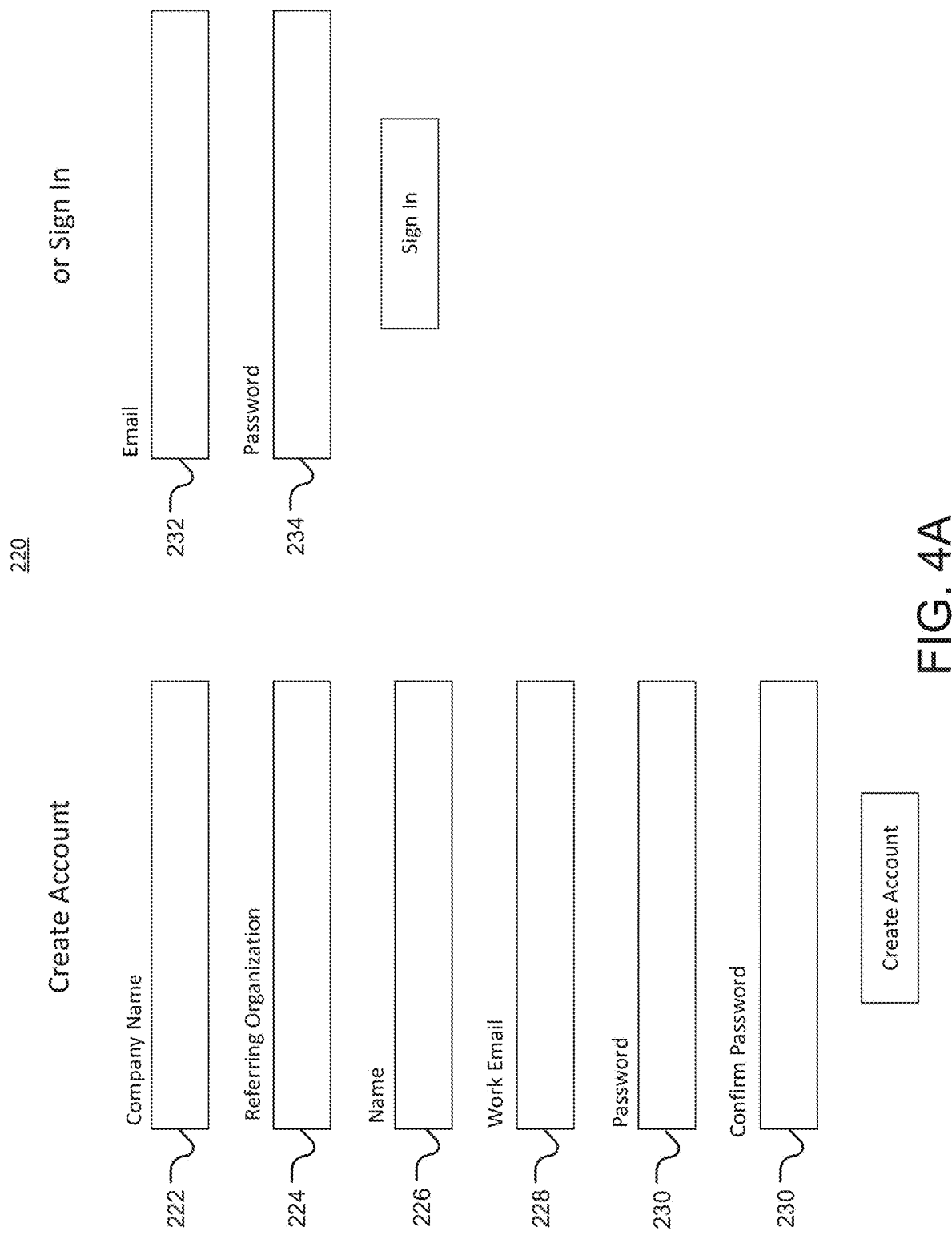

| | | |
|---|---|---|
| 238 | Age of Company | |
| 240 | Type of Company | |
| 242 | Location - Country | |
| 244 | Team Size | |
| 246 | Annual Revenue | |
| 248 | Type of Technology | |
| 250 | # of Paying Customers | |
| 252 | # of Non-Paying Customers or Proof of Concepts (POCs) | |
| 254 | Average one year deal value | |
| 256 | Where do you NOT want to operate | |

FIG. 4B

INDEXING ENTITIES BASED ON PERFORMANCE METRICS

CROSS-REFERENCE TO RELATED APPLICATIONS

This application claims priority under 35 U.S.C. § 119 to U.S. provisional patent application No. 62/902,280, entitled "Indexing Entities Based on Performance Metrics," filed on 18 Sep. 2019, which is incorporated by reference herein for all purposes.

FIELD

The present disclosure relates generally to systems and methods to evaluate and compare entities, such as businesses.

BACKGROUND

A company's performance level is important for various circumstances, such as, for example, deals (e.g., mergers, acquisitions, etc.), diligence, investor funding, management evaluation, strategic planning, recruiting, and the like. Often, however, information related to a startup company's business health is difficult to obtain. Further, the performance of small and large companies is influenced by different factors, presenting challenges to ranking the performance of both types of companies together in the same ranking system. The present disclosure is directed to methods that help to generate and coordinate different company performance rankings and utilize the rankings to output summary information, conduct diligence, and the like.

The information included in this Background section of the specification, including any references cited herein and any description or discussion thereof, is included for technical reference purposes only and is not to be regarded subject matter by which the scope of the invention as defined in the claims is to be bound.

SUMMARY

In one embodiment, a method of comparing performance of a first entity and a second entity uses performance indexing based on comparable performance metrics. A first entity performance rate and a first growth ability for the first entity are determined based on a first plurality of entity characteristics for the first entity. The first performance rate and the first growth ability are weighted based of the first plurality of entity characteristics and a first entity index value is determined based on the weighted first performance rate and first growth ability. A comparison between the first entity and the second entity is generated using the first entity index value and a second entity index value for the second entity.

In another embodiment, a method of connecting compatible entities based on a single indexing system is disclosed. The method includes retrieving, by a processor, one or more entity characteristics and an entity index value for an entity; comparing, by the processor, the one or more entity characteristics and entity index value to stored entity characteristics and associated stored entity index values to determine one or more compatible entities, wherein the entity index value and stored entity index values are indicative of entity performance ability and incorporated in the same indexing system; determining, by the processor, one or more compatible entities based on the comparison, wherein compatible entities have at least one compatible entity characteristic and similar performance abilities indicated by comparable entity index values within the indexing system; and transmitting, to a user device, compatible entity data based on the determination.

In yet another embodiment, an entity indexing system for indexing diverse entities based on comparable health metrics is disclosed. The system includes a database storing entity information and associated entity index values, wherein the associated entity index values are comparable indicators of entity health; a processing device; and a computer readable medium containing programming instructions. The programming instructions, when executed, cause the processing device to receive entity information for an entity; determine performance rate based on financial data associated with the entity information; estimate growth ability based on the financial data and operational data associated with the entity information; weight the performance rate and growth ability based on respective performance influencing factors and growth influencing factors associated with the entity information; determine an entity index value for the entity based on the weighted performance rate and growth ability; and store, in the database, the entity index value associated with the entity information for the entity.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. A more extensive presentation of features, details, utilities, and advantages of the present invention as defined in the claims is provided in the following written description of various embodiments and implementations and illustrated in the accompanying drawings.

BRIEF DESCRIPTION OF THE DRAWINGS

FIG. 4A is an example of a user interface to receive entity information.

FIG. 4B is another example of a user interface to receive entity information.

DETAILED DESCRIPTION

Figure 1:
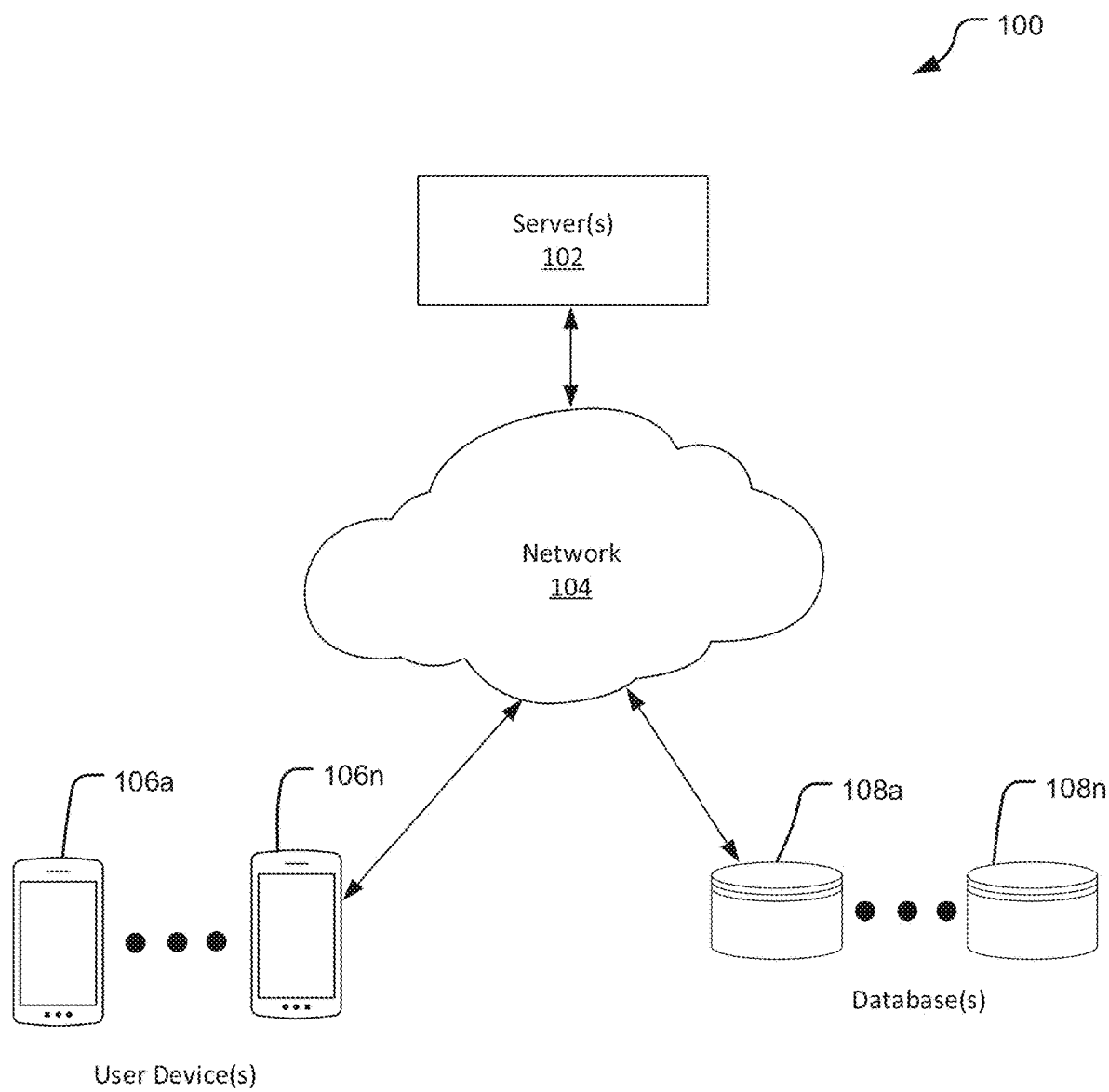
FIG. 1 illustrates a system diagram of a system for indexing entities.

The present disclosure relates generally to a system to manage, rank, score, or index diverse entities or parties, such as companies, based on comparable metrics. Diverse entities, such as large enterprise organizations and startup companies, may have different goals, metrics for health/success, financial circumstances, competitive advantage, experience, and the like. For example, $1m of revenue for a large enterprise may be considered a low revenue year, whereas $1m of revenue for a startup company within its first year may be considered a high revenue year. With the present system, diverse entities may be ranked within the same ranking system, allowing easier comparison of performance across varying entity characteristics. The entity indexing system may be used within a larger entity management system, for example, to determine and link compatible parties (e.g., parties with similar or compatible rankings), for strategic planning (e.g., to benchmark a target score over time), to increase business opportunities (e.g., high ranking parties may experience greater connections with other companies and/or investors, receive better deal terms, attract more talented candidates, etc.), for management evaluation, for diligence, assess legal risk for contract negotiations, and the like. For example, the index value may be used to assess a risk of partnering with a particular company for a product launch, joint development, or the like. As another example, the index value may be used by investors to determine likely return on investment.

In a specific example, the system may generate a company index or benchmark for companies allowing comparison of different types of companies on the same scale. For example, the system may analyze and index companies in different fields, as well as different growth stages, and/or years in operation, as the indexing may be based on performance and/or growth metrics or indicators that can be tailored to the specific type and market of the company. Performance indicators include characteristics indicative of the performance of a company from past to present, while growth indicators include characteristics indicative of the potential of a company to perform in the future. The performance and/or growth indicators may be weighted or otherwise analyzed based on company characteristics as enterprises and startups may have varying performance and/or growth indicators due to differences in company characteristics, such as operating time, funding, revenue, number of employees, market sector, location, customers, overall business strategy, company size, and the like. For example, a large enterprise typically has more years of operation and greater revenue than a startup company, which typically has an average lifespan of 2-5 years and accordingly more limited revenue. The system accounts for such differences in company characteristics when assessing company performance and/or growth to generate an index value. The index may present a way to uniformly present companies that takes into account these differences, such that a startup can be directly compared to an enterprise company in a manner that was not previously possible.

In several embodiments, indexing may be dynamically adjusted over time. For example, index adjustments may be based on changes to entity characteristics over time (e.g., as a company grows), marketplace trends, ecosystem information, competitive environment, and the like. As an entity's index value changes, the entity's connections, business opportunities, strategic plan, and the like may subsequently change.

In some embodiments, indexing may predict future performance of an entity based on the historical index values for the entity. Such predicted index values may be generated by extrapolating based on past performance. Predicted index values may also be generated for specific situations, such as predicting how an entity will perform in an economic downturn.

Turning now to the figures, a system of the present disclosure will be discussed in more detail. FIG. 1 is a block diagram illustrating an example of an entity management and indexing/ranking system 100, e.g., a company management and indexing platform. The system 100 includes one or more user devices 106*a-n* and one or more databases 108*a-*
*n*. The system 100 may also include one or more servers 102, which may be in communication with the user device(s) 106*a-n* and database(s) 108*a-n*. The various components of the entity management and indexing system 100 may be in communication directly or indirectly with one another, such as through a network 104. In this manner, each of the components can transmit and receive data from other components in the system. For example, the server 102 may be in communication with the user device(s) 106*a-n* and database(s) 108*a-n* over the network 104. In many instances, the server 102 may act as a go between for some of the components in the system 100.

The network 104 may be substantially any type or combination of types of communication system for transmitting data either through wired or wireless mechanism (e.g., cloud, Wi-Fi, Ethernet, Bluetooth, cellular data, or the like). In some embodiments, certain components in the entity management and indexing system 100 may communicate via a first mode (e.g., Bluetooth) and others may communicate via a second mode (e.g., Wi-Fi). Additionally, certain components may have multiple transmission mechanisms and be configured to communicate data in two or more manners. The configuration of the network 104 and communication mechanisms for each of the components may be varied as desired.

The server 102 includes one or more computing devices that process and execute information. The server 102 may include its own processing elements, memory components, and the like, and/or may be in communication with one or more external components (e.g., separate memory storage) (an example of computing elements that may be included in the server 102 is disclosed below with respect to FIG. 2). The server 102 may also include one or more server computers that are interconnected together via the network 104 or separate communication protocol. The server 102 may host and execute a number of the processes executed by the system 100 (e.g., an indexing algorithm).

The server 102 has or offers a number of configurable application programming interfaces (API) that can be accessed and used from an application on a user device 106 to send and receive data to the server 102. To prevent unauthorized access, applications may be required to authenticate sessions or connections via a license key or other code.

The user device(s) 106*a-n* may be any of various types of computing devices, e.g., smart phones, tablet computers, desktop computers, laptop computers, set top boxes, gaming devices, wearable devices, or the like. The user device(s) 106*a-n* provides output to and receives input from a user. For example, the user device(s) 106*a-n* may receive entity information updates (e.g., company data updates) from a user and output entity data, index values or rankings, and notifications or alerts to a user. The type and number of user devices 106*a-n* may vary as desired.

The database(s) 108*a-n* store data that can be used by the server(s) to manage and coordinate various entities, determine index values for the entities managed by the system, or institute changes to the management or indexing mechanisms. The databases may be stored on the server(s) and/or may be separate structures accessible by the server(s) as needed. For example, the database 108 may store entity data (e.g., company health data) input into the system 100 and entity index values or rankings determined by the system 100. As another example, third party databases may be accessed, for example, that contain public or other accessible information on an entity (e.g., business and/or financial information available on the U.S. Security and Exchange Commission databases). In many instances, the system may include a combination of managed and third party databases.

Figure 2:
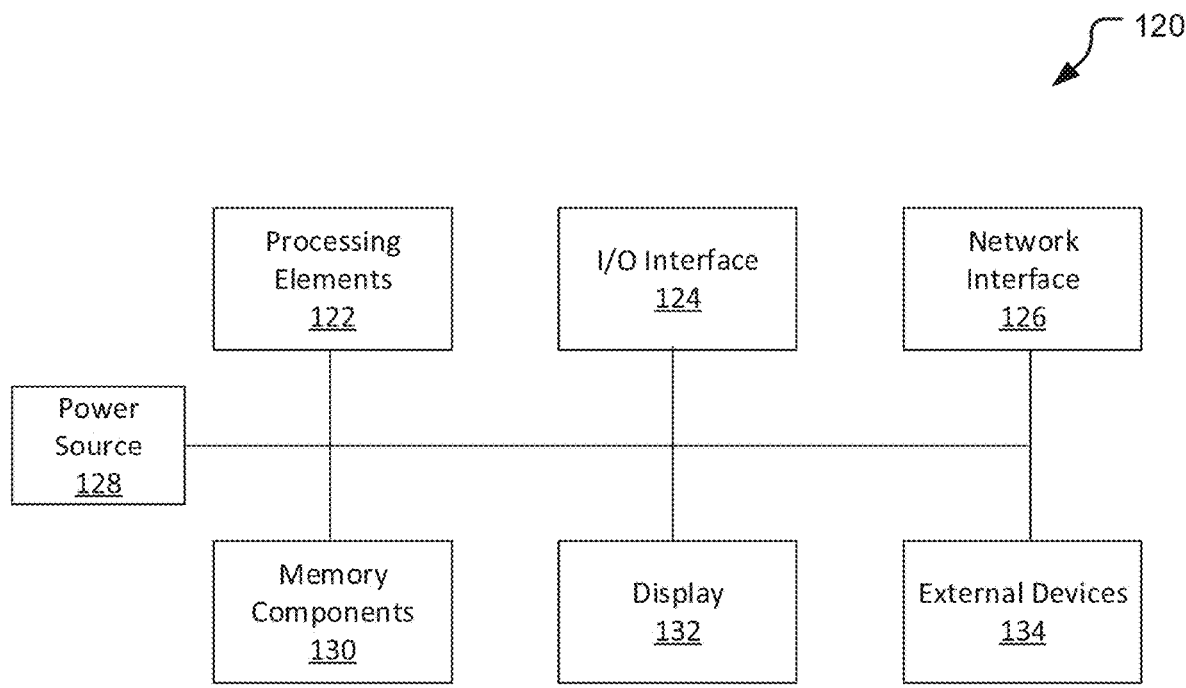
FIG. 2 illustrates a simplified block diagram of various computing devices of the system of FIG. 1.

A simplified block structure for a computing device that may be used with the system 100 or integrated into one or more of the system 100 components is shown in FIG. 2. For example, the server 102, user device(s) 106*a-n*, and/or database(s) 108*a-n* may include one or more of the components shown in FIG. 2 and use one or more of these components to execute one or more of the operations disclosed in methods 150, 300, and 350. With reference to FIG. 2, the computing device 120 may include one or more processing elements 122, an input/output interface 124, a network interface 126, a power source 128, one or more memory components 130, a display 132, and one or more external devices 134. Each of the various components may be in communication with one another through one or more busses, wireless means, or the like.

The one or more processing elements 122 are any type of electronic device capable of processing, receiving, and/or transmitting instructions and data. For example, the processing element 122 may be a central processing unit, microprocessor, processor, microcontroller, graphical processing unit, or a combination of multiple processing elements. For example, a first processing element may control a first set of components of the computing device and the second processing element may control a second set of computing devices, where the first and second processing elements may or may not be in communication with one another. Additionally, the processing elements may be configured to execute one or more instructions in parallel and across the network, such as through cloud computing resources.

The input/output (I/O) interface 124 receives and transmits data to and from the network 104. The input/output interface 124 allows a user to enter data into the computer 120, as well as provides an input/output for the computer 120 to communicate with other devices (e.g., server 102, other computers, speakers, etc.). The I/O interface 124 can include one or more input buttons, touch pads, and so on. For example, a user may input data related to an entity (e.g., operational data, financial data, etc.) into the management and indexing system 100. As one example, a user may create an entity profile or account that is stored by the system 100. Access to the entity account may be limited, e.g., by a username and password. The user may access the management and indexing system 100 through the entity account. For example, upon accessing the system 100 (e.g., by logging into the entity account), a user may search for other entities having entity information stored within the system 100, review such entity information, connect with such entities, review entity index values, organize entity information by index values, and the like.

The network interface 126 provides communication to and from the computer 120 to other devices. For example, the network interface 126 allows the server 102 to communicate with the user device(s) 106*a-n* through the network 104. The network interface 126 includes one or more communication protocols, such as, but not limited to Wi-Fi, Ethernet, Bluetooth, and so on. The network interface 126 may also include one or more hardwired components, such as a Universal Serial Bus (USB) cable, or the like. The configuration of the network interface 126 depends on the types of communication desired and may be modified to communicate via Wi-Fi, Bluetooth, and so on.

The power supply 128 provides power to various components of the computing device 120. The power supply 128 may include one or more rechargeable, disposable, or hardwire sources, e.g., batteries, power cords, or the like. Additionally, the power supply 128 may include one or more types of connectors or components that provide different types of power to the computing device 120. In some embodiments, the power supply 128 may include a connector (such as a universal serial bus) that provides power to the computing device 120 or batteries within the computing device 120 and also transmits data to and from the device to other devices.

The one or more memory components 130 stores electronic data, such as, for example, entity data (e.g., company data), legal risk data, index data, timing information (e.g., information relevancy data), indexing algorithm(s), and the like, that may be utilized by the computing device 120. The one or more memory components 130 may include electrical data or content, such as processor instructions (software code), audio files, video files, document files, and the like. The one or more memory components 130 may include multiple components, such as, but not limited to, non-volatile storage, a magnetic storage medium, optical storage medium, magneto-optical storage medium, read only memory, random access memory, erasable programmable memory, flash memory, or a combination of one or more types of memory components. In many embodiments, the server 102 may have a larger memory capacity than the user devices 106*a-n*.

The display 132 provides visual feedback to a user and, optionally, can act as an input element to enable a user to control, manipulate, and calibrate various components of the computing device 120. The display 132 may be a liquid crystal display, plasma display, organic light-emitting diode display, and/or cathode ray tube display. In embodiments where the display 132 is used as an input, the display 132 may include one or more touch or input sensors, such as capacitive touch sensors, resistive grid, or the like.

The external devices 134 are one or more devices that can be used to provide various inputs to the computing device 120, e.g., mouse, microphone, keyboard, trackpad, or the like. The external devices 134 may be local or remote and may vary as desired.

It should be noted that the computing device 120 may be in communication with a compute back end, such as the server 102 or a cloud provider, e.g., Google Cloud Platform, Amazon Web Services, Microsoft Azure, or the like.

Figure 3:
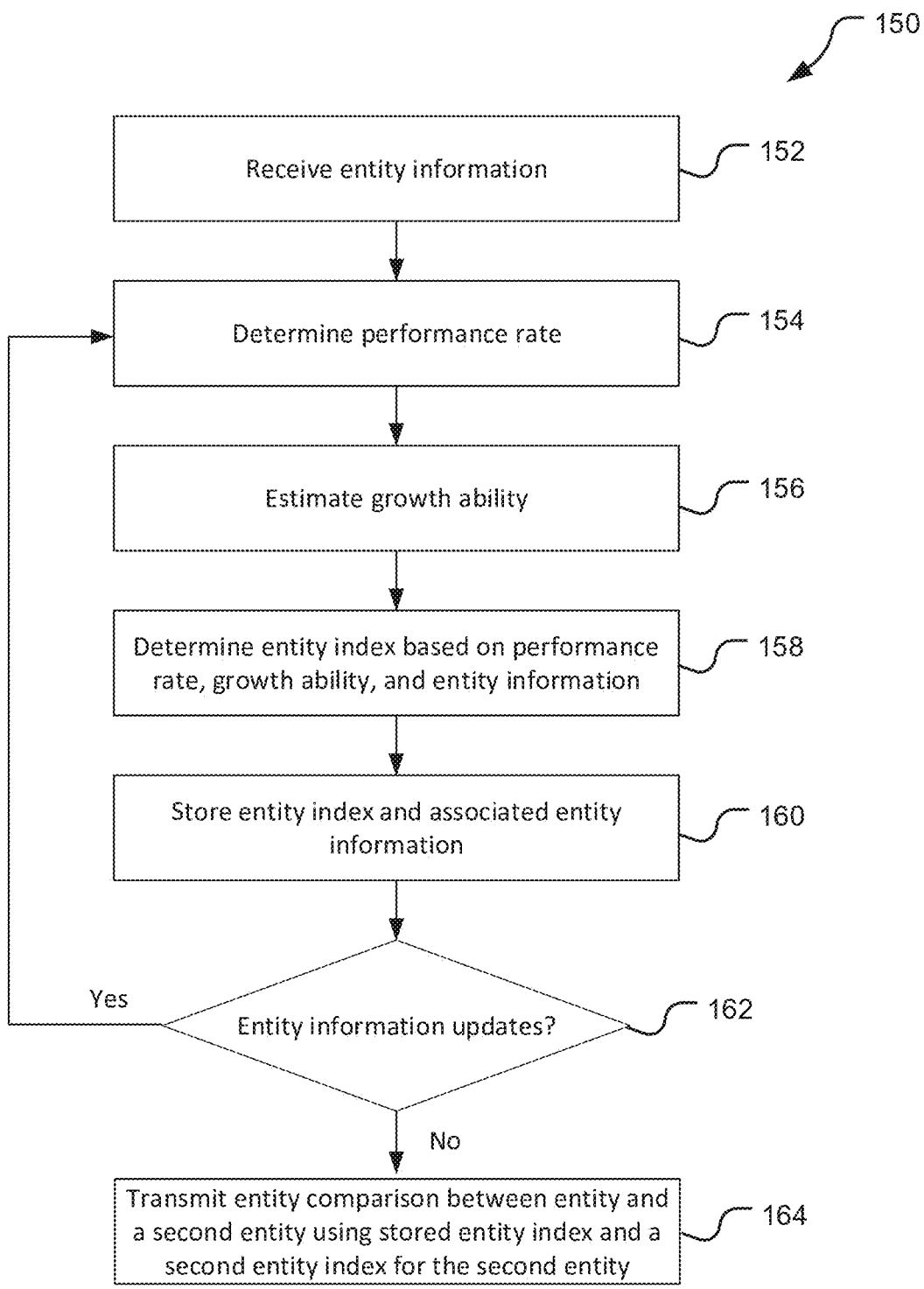
FIG. 3 is a flow chart illustrating a method for ranking an entity based on an entity index.

FIG. 3 is a flow chart illustrating a method for indexing or ranking an entity based on entity health metrics. The method 150 begins with operation 152 and the server 102 receives entity or party information. For example, the server 102 may retrieve entity information from information entered via a user device 106*a-n* (e.g., when generating a profile or account or during additional data entry points, e.g., supplemental entries); third party sources, such as, for example, social media, crowdsourcing, the Internet, news sources, websites (e.g., Glassdoor), third party databases (e.g., Crunchbase®, PitchBook™, etc.), the Securities and Exchange Commission (SEC), and the like; and/or system based sources (e.g., information from related or similar entity entries or updates stored within the system). Entity information may include entity type (e.g., startup or enterprise) and entity characteristics. Entity characteristics can include revenue (e.g., total, growth, average amount per month or year, etc.), cost of revenue, funding (e.g., total, stage, average amount per year or quarter, etc.), post valuation after funding rounds, number of employees, net income, operating income, assets, liabilities, equity capital, working capital, short term and long term investments, acquisition details, industry, and the like. In some instances entity information may be retrieved directly, such as from a user or a database, while in other instances entity information may be indirectly determined or derived, such as from other data. For example, total revenue may be an actual number or may be determined based on trends, such as those determined by historical data, or revenue data over a period of time, such as quarters, months, years, etc.

FIGS. 4A and 4B illustrate examples of user interfaces that can be displayed on a user device 106*a-n* that allow the user to enter entity information into the system. As shown in FIG. 4A, a login user interface 220 is displayed on the user device 106*a-n* and includes input fields, allowing a user to input information corresponding to the entity or party. In particular, the login user interface 220 includes a company name field 222 where the user can enter in the name of the entity. The login user interface 220 also includes a referring organization field 224 where the user can optionally include a referring organization, such as another entity, that has directed them to the platform or system 100. As can be appreciated, data related to the referring organization can be used to determine additional information about the entity, especially in instances where the referring organization and the entity have some form of a relationship and share data, and particularly where the entity may not be well known, e.g., a startup company in very early growth stage. Additionally, the login user interface 220 may include identification and contact fields, such as a name field 226, email field 228, and password input and confirmation fields 230. Information entered by the user into these fields can be used to generate an entity entry into an entity database on the server 102, which allows the user to enter and update information in the system, review index values and rankings, search for other parties on the platform (e.g., compatible parties or parties meeting particular qualifications), etc. For example, once the user has generated an entry in the system database corresponding to its entity, the user can directly login into the system such as via the sign in fields 232, 234 where the user enters his or her email and password, which is then validated with the entity database on the server 106, and if correct, allows the user to view information corresponding to their represented entity.

After the user has created a user name in the entity database and/or after logging into the system, an entity information graphical user interface can be used to receive information from the user. With reference to FIG. 4B, an entity information user interface 236 is transmitted by the server 102 to the user device 106*a-n*. In this example, the entity information user interface 236 may include one or more entity data fields configured to receive entity characteristic information directly from the user representing the entity. Examples of entity fields can include, age of the company 238 (e.g., years in operation), type of company 240 (e.g., LLC, Ltd., Inc., enterprise, startup, etc.), location 242 (e.g., city, state, country, or the like), team size 244 (e.g., number of employees or persons in the entity, etc.), annual revenue 246, type of technology 248, number of paying customers 250, number of other customers 252 (e.g., non-paying or proof of concept customers or users), average one year deal value 254 (e.g., average values of deals that the company has previously executed or is looking for), number of current pilots, industry sector (hardware vs. software vs. tech enabled services), revenue per month, experience of founders and other key employees, money values and class raise (e.g., friends and family vs. series A vs. series B), growth rate and/or stage, board structure (e.g. private vs. public), and optionally areas where the company does not want to operate 256, such as excluded regions, or the like. The company fields are selected to receive information directly into the system from the user regarding the entity. In some instances the fields may be open, allowing a user to provide a textual input, but in other examples, the fields may be varied and include drop down menus, receive URL links, selectable options, or the like.

The information received regarding the entity as input directly by the user may be transmitted to the server 102 and correlated to the entity entry in an entity database. With reference again to FIG. 3, once the entity information is received at operation 152, the method 150 proceeds to operation 154 and the entity's performance rate is determined. Performance rate may be determined based on an analysis of factors indicative of the performance of an entity (e.g., a company) over a period of time. The period of time may be a period of time entirely in the past (i.e., historical performance) or a period of time extending into the present (i.e., current or more relevant performance). For example, the period may be the first few years of operation (e.g., a period of time entirely in the past) or the last 4 years of operation to present day (e.g., a period of time extending into the present). The period of time may vary depending on the type of entity. For example, the total number of years considered for an enterprise may be limited to 4 years to focus on recent events in the enterprise's performance, while the number of years considered for a startup may be over the life of the startup (e.g., 8-10 years). Further, historical performance data for individuals associated with the entity may be considered even when such data predates the lifetime of the entity. For example, performance of past entities under the same management may be considered in determining performance rate of an entity. However, the number of past years to consider may vary.

Factors influencing performance rate may include the ability to generate revenue from funding, the latest available fund to perform aggressively, and the like. The performance influencing factors analyzed may be different for different entities, e.g., based on varying entity characteristics. In other words, depending on the entity type, the factors considered for a performance rating will vary. For example, performance influencing factors for an enterprise may be different than those for a startup company since an enterprise typically operates for longer and has greater revenue than a startup company. For enterprises, performance rate may be influenced by factors, such as net income, operating income/loss, working capital (e.g., of previous years), equity capital (e.g., the difference between total assets and total liabilities) (e.g., for the latest year), cost of revenue, short term and long term investments, and the like. For example, working capital turnover can be calculated by net sales or revenue divided by working capital. However, in order to eliminate the influence from high Cost-of-Goods-Sold (COGS), net income may be selected instead of revenue to assess performance. As one example, for a given number of past years, the sum of the ratio between net income and working capital is indicative of how that enterprise performed during those years. This element is added to the current year's equity capital since corporate decisions and strategies for the current year often depend on the latest equity capital.

The performance influencing factors for a startup may be different from those of an enterprise based on the manner in which startups function. For example, performance influencing factors for a startup may include total revenue generated, total funding received, the latest round of funding, post valuation after funding round, year founded, acquisition details, and the like. For example, for startups, the ability to generate revenue from funding (a performance influencing factor) is determined by the ratio of total revenue generated from total funding over time (e.g., over years). As another example, the latest available fund to perform aggressively (another performance influencing factor) for a startup is the latest round of funding that allows hiring resources. As one example, from the year a startup is founded, the startup's performance is influenced by the sum of the ratio between the revenue generated and the funding received. Such data (e.g., revenue and funding data) may be difficult to obtain for a startup company as such data is often kept private. In such circumstances, an indexing algorithm implemented by the server to determine an entity index value for a startup company may use various assumptions related to startup companies to evaluate performance influencing factors. For example, where data is missing, the algorithm may extrapolate data and/or input assumptions such as include an assumption that a startup company does not make revenue in the first year. The algorithm may also assume startup revenue grows in a linear fashion from the second year to the current year to estimate revenue generated by the startup in each year. Similarly, the indexing algorithm may assume or interpolate values for number of employees in a given year, funding received by the entity in a given year, etc. In some implementations, several variables may be related such that known factors may be used to estimate unknown factors. For example, a correlation between funding and number of employees (which may be specific to industry, geographic location, or other subsets of entities) may be used to estimate the amount of funding an entity received in a year based on employees hired in a given year. In this manner, the system is able to index startup companies even if limited information is provided.

In various implementations, performance influencing factors may also include assessment of legal risk incurred by an entity as a result of, for example, handling and storing of sensitive data, operation in a litigious industry or sector, intellectual property strategy, or the like. Measures of legal risk may be quantified using, for example, methods of entity evaluation described in U.S. Patent Application No. 62/905,001, entitled "Dynamic and Automatic Agreement Generation and Modification," filed Sep. 24, 2019, docket number P282193.US.02, which is hereby incorporated by reference in its entirety. As with other performance influencing factors, legal risk may be weighed or analyzed differently depending on the status of the entity as a startup or enterprise. For example, a high legal risk assessment may have greater impact on the index value of a startup, which may have fewer resources allocated to legal issues such as compliance, litigation, and the like.

Performance influencing factors may also include, in various examples, past performance of individuals associated with an entity (e.g., a management team or founder). Performance of individuals associated with an entity may include past performance of other entities, e.g., the CEO of a startup may analyzed based on the performance of a pervious company lead by the CEO. Further, in some implementations, performance of, for example, a management team, may be determined based on historical performance of the entity relative to other similar entities. For example, where an entity, over a historical period, outperforms similar entities with similar resources by, for example, generating more revenue, the management team may be assigned a higher performance value over the historical time period. Performance of the management team may then be quantified and provided as a performance influencing factor for determination of the index. Further, where a member of the management team moves to another entity, the performance of the management member at the previous entity may be used as a performance influencing factor for the new entity.

After operation 154, the method 150 proceeds to operation 156 and the entity's growth ability is estimated. Growth ability may be determined based on one or more entity characteristics indicative of the potential of a company to perform or grow in the future. For example, growth ability may be influenced by the ratio between revenue and number of employees as revenue per employee allows the company to spend in growth opportunities. This ratio between revenue and employees may be used to determine growth for various entities, such as both startups and enterprises. As another example, growth ability for a startup company may be estimated based on the type of investors funding the startup. For example, an investor that historically funds startups having aggressive growth may reflect a strong growth potential of the startup company being funded by that investor. Growth ability may also be influenced by the industry or type of technology created by the entity.

After operation 156, the method 150 proceeds to operation 158 and the entity index value is determined based on the performance rate, growth ability, and entity information. An entity index value is a marker or identifier of entity health as compared to other entities measured with the same indexing or metrics. For example, an entity index value may be a numerical value within a range of values. For example, the value may be in a range from 0-10, 1-30, 1-50, 1-100, or the like. In this example, the entity index value may have one or more decimal points. For example, the entity index value may be a 15.5 on a scale of 1-20. A healthy entity (e.g., a high performing company) may have a low or high entity index value, depending on the indexing system. For example, an index may range from 1-100, with a 1 being a low ranking entity and a 100 being a high ranking entity, or vice versa, with a 1 being a high ranking entity and a 100 being a low ranking entity. In some embodiments, an entity may have an entity index value with a negative value. For example, a bankrupt company may have a negative index value.

For companies, an entity index is related to both the company's performance rate and growth ability. In one example, an entity index value may be determined by the following equation:

$$\text{Index Value} = \text{Performance Rate} \times \text{Growth Ability} \quad \text{Eq. (1)}$$

Index values may be calculated using different formulas for established entities or enterprises and startup entities. The different formulas are, however, generally determined so that the indexes generated by the formulas may be used to directly compare performance of a startup to performance of an established or enterprise entity. For example, an index for an enterprise may be determined using the equation:

$$\text{Enterprise Index} = \left\{ \left( \frac{\sum NetIncome_i}{\sum WorkingCapital_i} + \log_{10} EquityCapital \right) \times \log_{10}\left(\frac{Revenue}{Employees}\right) \right\} \quad \text{Eq. (2)}$$

where i is the number of years for which net income and working capital are available, and equity capital, revenue, and employees are each current values. An index for a startup may be determined by first estimating the total revenue of the startup using the equation:

$$\text{Estimated Total Revenue} = \left(\frac{\text{Revenue}}{\text{Years} - 1}\right) \times \left(\frac{\text{Years}^2 - \text{Years}}{2}\right) \quad \text{Eq. (3)}$$

where revenue is the total current revenue and years is the years the startup has been operating. Equation 3 may be adjusted based on various assumptions. For example, the above formula includes an assumption that a startup does not generate revenue in its first year. When the total revenue is estimated, the index for the startup may be determined using the equation:

$$\text{Startup Index} = \left\{\left(\frac{\sum \text{Revenue}_i}{\sum \text{Funding}_i} + \log_{10}(\text{LatestFunding})\right) \times \log_{100}\left(\frac{\text{Revenue}}{\text{Employees}}\right)\right\} \quad \text{Eq. (4)}$$

where Revenue is revenue per year, i is the number of years in operation, employees is the current number of employees and latest funding is the amount of the startup's most recent funding round. Where equation 3 is used in place of known revenues for each year of operation, the estimated total revenue value may be used for the ΣRevenue, term of equation 4.

In various implementations, an entity index value may be determined using various machine learning models which may be generated or trained using a set of historical index data for a variety of entities. In some implementations, the models may be generated or trained using index values calculated with the equations disclosed above. For example, index values may be calculated for a training set of entities with known values and the training set may be used to generate a neural network or graph based network model. Entity information for an entity may then be provided as input and an index value for the entity may be predicted using clustering to identify similar entities with known indexes. In another implementation, a random forest classifier may be trained used training set data and may then be used to generate index values for new entities. In various implementations, such models may include one or more of various types of classifiers, deep learning networks, or other supervised or unsupervised models. Such models may, in some implementations, be updated over time through feedback on generated index values and entity health.

In several embodiments, the performance rate and/or growth ability may be weighted based on the entity information (e.g., on one or more entity characteristics, such as entity type) to determine the index. For example, one or more entity characteristics may be weighted to account for differences between diverse entities. In this example, an entity characteristic may be assigned different weights depending on the selected characteristic for the select entity. For example, one or more weighting functions (e.g., logarithmic functions) may be applied to values for one or more entity characteristics. In several embodiments, the functions applied may vary based on the entity type (e.g., different functions, values, or variables may apply depending on whether the entity is a startup or enterprise) in order to weight the entity types based on differences in their characteristics and compare them in a single ranking system.

For example, Equation 2 and Equation 4 each include a term $$\frac{\text{Revenue}}{\text{Employees}}$$

as part of the growth ability of equation 1. However, the term is weighted differently in equation 2 and equation 4, such that the growth ability term is weighted higher for an enterprise entity than for a startup entity. Weightings may further vary for other types of companies. For example, in some implementations, rather than being identified as a startup or an enterprise, an entity may be assigned a score based on whether the entity is more like a startup or more like an entity and the growth ability of the entity would then be weighted accordingly. For example, an entity that falls exactly between a startup and an enterprise may have an index calculated with a growth ability term weighted by taking the logarithm to a base of 50 of the $$\frac{\text{Revenue}}{\text{Employees}}$$

term.

As one example, a startup's latest round of funding (e.g., a performance influencing factor) may be calculated as a logarithm to the base 100, while an enterprise's equity capital (e.g., a comparable performance influencing factor to the latest round of funding) may be calculated as a logarithm to the base 10. The growth ability may also be tuned or weighted by a logarithm. As yet another example, a select numerical value may be assigned to a select entity characteristic depending on one or more entity characteristics (e.g., the entity type, sector, etc.). For example, a higher numerical value may be assigned for a particular revenue value or value range for a startup company than an enterprise. For example, an annual revenue value range of $500K to $1m for a startup company may be assigned a first weight (e.g., value of 8), while an annual revenue value range of $500K to $1m for an enterprise may be assigned a second weight (e.g., value of 3), with the first weight being greater than the second weight. In this manner, certain entity characteristics may be given greater weight for a startup company than an enterprise to enable such diverse companies to be ranked in the same index system.

It is contemplated that weighting may be dynamic. For example, as entity characteristics change over time, the one or more weights applied to the entity characteristics may be adjusted. For example, a particular sector or industry may become more popular allowing companies in the sector to thrive, improving their performance rate and growth ability. In this example, a different weight may be applied to one or more entity characteristics based on the popularity of the company's sector. For example, a revenue value considered high performing for the particular sector before the increase in sector popularity may be considered low performing with the increased sector popularity. In this example, a first weight (e.g., value of 7) may be applied to the revenue value for the company prior to the increase in sector popularity, while a second weight (e.g., value of 4) may be applied to the revenue value for the company after the increase in sector popularity, e.g., with the first weight being greater than the second weight. In a similar manner, a weight may be decreased depending on the change in an entity characteristic. The new weights may be stored by the system.

In some implementations, the entity index determined in operation 158 may be a predicted entity index predicting future performance of an entity. Predicted index values may be made based on a calculated present index value extrapolated to some future desired time. Extrapolation may include historical index values, which may be based on actual historical data or estimated historical data for an entity. For example, actual historical data may be the actual revenues generated by an entity for each year in operation. Estimated historical data may, for example, estimate revenue for a given year based on known revenue for other years in the historical time period. In some implementations, the estimated historical data may be adjusted based on external factors such as, for example, economic downturns, revenue reported by other entities in the same or similar industries, etc. In various embodiments, a user may define additional parameters for an estimated future index to simulate how an entity or entities may perform relative to one another in varying market conditions. For example, the predicted index may be generated for a simulated economic downturn and may, in some implementations, be compared to a predicted index in a stable or high growth market.

After operation 158, the method 150 proceeds to operation 160, and the entity index and associated entity information is stored in a system database 108a-n. For example, the entity database discussed above may have numerous entity entries associated with entity index values. The entity index values may be stored in a single location forming a list of entity index values.

The algorithm to determine the entity index may be dynamically adjusted as feedback is received in order to better calculate the entity index and provide an accurate assessment of entity health. For example, entity health and/or performance may be evaluated over time after an entity index is generated and feedback related to the current or actual entity health and/or performance may be input into the system (e.g., via a user device) or determined by the system (e.g., the server assessing current or actual/real-time entity data input into the system). As feedback is received related to current or actual entity health, performance, or other factors, such as legal risk, the system may determine whether the calculated health score reflects the current or actual entity health and/or performance or not (e.g., whether the current or actual entity health deviates from the predicted health represented by the entity index), and adjust the algorithm accordingly to more accurately reflect entity health with the indexing system.

After operation 160, the method 150 proceeds to operation 162, and the system determines whether there are updates to the entity information (e.g., received at operation 152). Entity information may change over time as a company grows, sells or acquires assets or companies, changes ownership and/or management, enters deals, and the like. Entity information may also change over time based on changes in marketplace trends, ecosystem information, competitive environment, and the like. Updates to entity information may be retrieved by the system at predetermined intervals, which may be reoccurring, random, or the like, or on demand as new entity information is received by the system. The system may automatically search for entity information updates or may receive entity information updates from a user. For example, the server 102 may retrieve entity information updates from new information entered via a user device 106a-n (e.g., during additional supplemental entries); third party sources, such as, for example, social media, the Internet, news sources, websites, third party databases, and the like (e.g., via web-scrubbing, business reporting and valuations, detected trends, etc.); and/or internal sources (e.g., information from related or similar entity entries or updates). For example, the server 102 may review information from third party sources periodically or after a set amount of time.

If there are no updates to the entity information, the method 150 may proceed to operation 164, where the entity is compared to at least a second entity by comparing the entity index to a second entity index associated with the second entity. The second entity may be a comparable entity (e.g., of a similar age, in a similar industry, of a similar size, generating similar revenue) or the second entity may be a different type of entity that may otherwise be difficult to compare with the first entity. For example, the second entity may be a large enterprise operating in e-commerce while the entity may be a bioinformatics startup. For an investor or other interested person, such as a person offered employment at both entities, a direct comparison between the entity and the second entity may be difficult due to different measures of success for the two entities. However, the index values are generated to assist in creating a direct comparison between performance of the two entities relative to the situations of each of the entities.

If there are updates to entity information, the method 150 proceeds through operations 154-160 and the system determines and stores an updated entity index based on the updated entity information.

Figure 5:
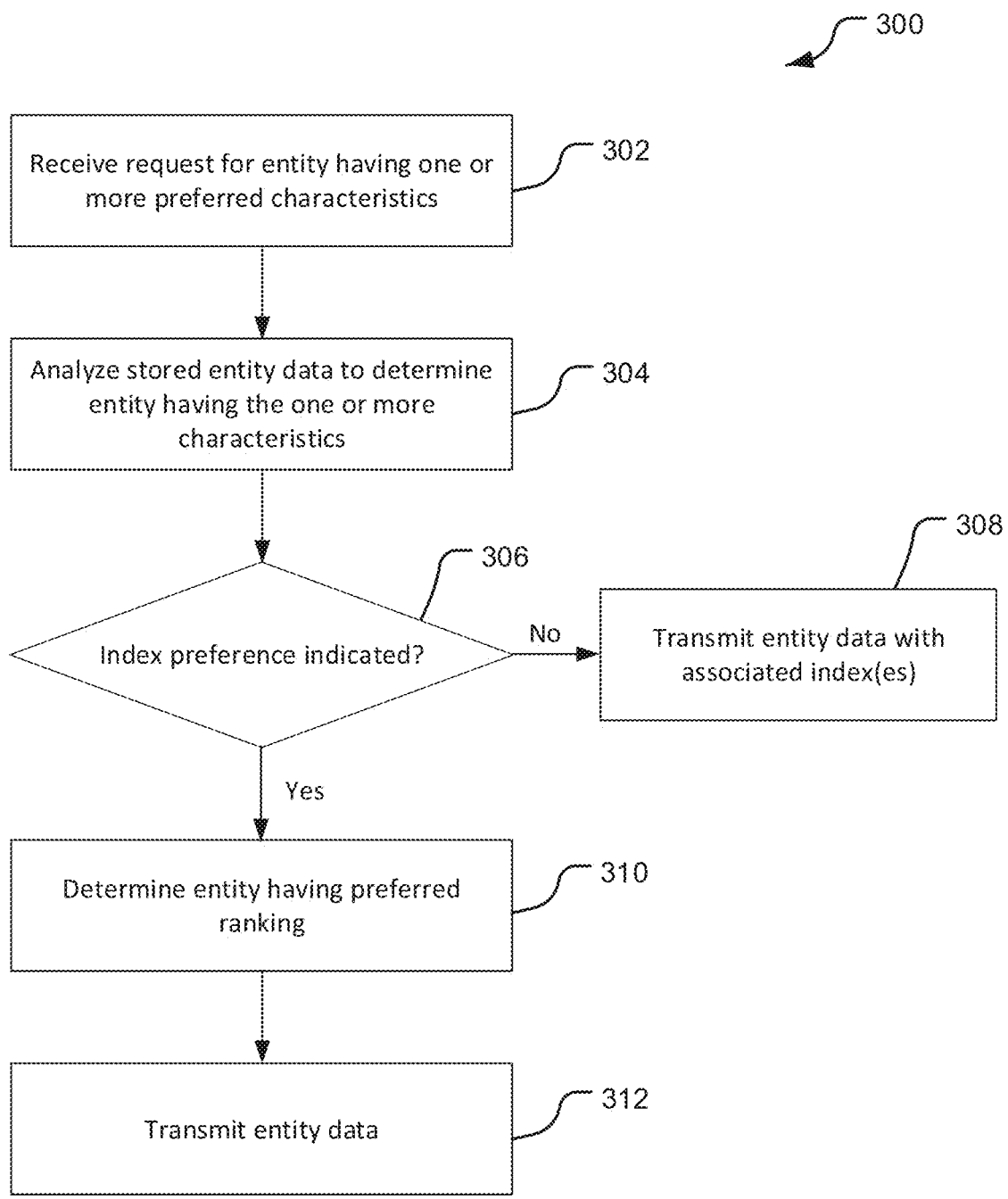
FIG. 5 is a flow chart illustrating a method for providing entity data based on search query parameters.

An entity management and indexing system of the present disclosure may be used for multiple purposes. As one example, the entity management and indexing system may be used to locate companies satisfying select criteria. For example, FIG. 5 is a flow chart illustrating a method for retrieving entity data for display based on search query parameters. The method 300 begins with operation 302 and a request is received for an entity having one or more preferred characteristics. For example, a user representing an entity may input, via a user device 106a-n, one or more preferred characteristics in a search for an entity having those characteristics. For example, a company may desire to partner with another company meeting certain criteria or may use another company for particular services or products. As one example, an enterprise may use a startup company for research and development, technological expertise and support, consulting, and the like. The startup's sector, technology, staffing, success, and other credentials are important for an enterprise to select a startup company that is capable of handling the enterprise's needs, particularly when the enterprise itself is successful and growing. With the present system, a user may search for an entity having one or more preferred characteristics (e.g., that satisfies certain credentials to meet the user's or the user's associated entity's needs). For example, preferred characteristics may include a particular entity type (e.g., startup, enterprise, corporation, LLC, etc.), field/market sector (e.g., technology, consumer products, beauty products, services, etc.), financial status (e.g., funding, stage, revenue, etc.), operations (e.g., operating time, number of employees, location, customers, overall business strategy, etc.), and the like.

After operation 302, the method 300 proceeds to operation 304 and stored entity data is analyzed to determine an entity having the one or more preferred characteristics. For example, as discussed, entity characteristics may be stored by the system. For example, entity characteristics may include entity type, field/market sector (e.g., technology, consumer products, beauty products, services, etc.), operating time, funding (e.g., total amount, stage, last round, etc.), revenue, number of employees, location, customers, overall business strategy, and the like. The server may analyze the stored entity characteristics to determine those that are similar to or match the preferred characteristics. The system may determine an entity has the preferred characteristics when all or some of the entity's characteristics match the preferred characteristics. For example, if an entity's stored characteristics match the preferred characteristics by 50% or more, then the system may determine the entity has the preferred characteristics. As another example, some preferred characteristics may be weighted greater than others, such that the system may determine an entity has the preferred characteristics when the entity's stored characteristics match the greater weighted preferred characteristics. For example, an entity may have stored entity characteristics that satisfy the preferred entity type, market sector, and financial status, but not location. In this example, the entity may still be considered to have the preferred characteristics since the entity's stored characteristics match 75% of the preferred characteristics. Further, if the market sector is given the most weight (e.g., if an enterprise is looking for a startup in a particular technology field to satisfy technology-specific needs), then the entity may still be considered to have the preferred characteristics since the entity's market sector matches the preferred market sector. Alternatively, with this example, the entity may not be considered to have the preferred characteristics because the entity's location does not match the preferred location.

In some implementations, operation 304 may also remove entities from consideration having various undesired characteristics. Such undesired characteristics may be received at operation 302 with preferred characteristics. Undesired characteristics may include, for example, entities having above a threshold level of legal risk due to data privacy risks, operation in litigious sectors or industries, regulatory compliance risks, intellectual property strategy, and the like. These risks may be quantified using, for example, methods of entity evaluation described in U.S. Patent Application No. 62/905,001, entitled "Dynamic and Automatic Agreement Generation and Modification," filed Sep. 24, 2019, docket number P282193.US.02, which is hereby incorporated by reference in its entirety. For example, a potential investor may exclude entities that process certain types of personal data more likely to cause data privacy risks or result in litigation.

After operation 304, the method 300 proceeds to operation 306, and the system determines whether an index value preference is indicated. For example, a preferred rank or index value may be input into the system with the one or more preferred characteristics input at operation 302. As discussed, an entity rank or index value may be related to an entity's performance rate and growth ability. The entity index value may therefore be indicative of an entity's capacity, capability, competency, reputability, and the like. Thus, finding an entity with a high or good index value (e.g., showing good performance and growth) may be important when an entity is looking to partner or contract with another entity. The index value preference input into the system may be a single index value, a range of index values, an index value threshold (e.g., index values above a certain number), and the like.

If an index value preference is not indicated, the method 300 proceeds to operation 308 and entity data with associated index value(s) is transmitted to a user device 106a-n associated with the user who requested the information. For example, the system 100 may output a display of search results satisfying the preferred entity characteristics ordered by index values. For example, entities with the highest index values may be displayed first. In this manner, a user may locate preferred entities with high index values (e.g., good performance and growth metrics). The display may include an option to filter the search results by criteria other than index value, e.g., by relevance or by the number of preferred entity characteristics satisfied (e.g., entities with the greatest number of preferred entity characteristics may be displayed first or only entities having all preferred entity characteristics are displayed) or any combination thereof.

If an index value preference is indicated, the method 300 proceeds to operation 310 and an entity having the preferred index value is determined. For example, the system 100 may analyze stored entity index values to determine stored entity index values matching the preferred index. In the example where the index value preference is a single index value, stored entity index values matching the preferred index value have the same index value as the preferred index value. In the example where the index value preference is a range of index values, stored entity index values matching the index value preference have index values falling within the range of preferred index values. In the example where the index value preference is an index value threshold, stored entity index values matching the index value preference have index values that match or exceed the index value threshold.

After operation 310, the method 300 proceeds to operation 312 and the entity data is transmitted to a user device 106a-n associated with the user who requested the information. For example, the system 100 may output for display on a user device 106a-n search results satisfying the preferred entity characteristics and index value preference. As discussed, the search results may be filtered by various means, such as, for example, by index, relevance, criteria satisfaction, and the like.

In several embodiments, the system 100 may automatically or upon request associate an entity with one or more compatible entities based on stored entity data and associated index values. Compatibility between entities may depend on the entity type, sector, index (e.g., performance and growth), goals/missions, customers/target market, competitors, and the like. For example, an enterprise may be compatible with a startup company that is in the same or a particular sector (e.g., a sector often associated with the enterprise's business), has a similar target market, shares competitors, and the like. Often, a startup is compatible with a high performing enterprise when the startup is also high performing (e.g., within its particular sector). For example, a high performing enterprise may have several needs that require high productivity and quick results. In this example, a compatible startup would need to be high performing to be able to quickly meet such needs. An indexing system of the present disclosure makes it easier for compatible entities to connect since parties with compatible performance, productivity, growth, and the like, can be determined based on comparable index values.

Figure 6:
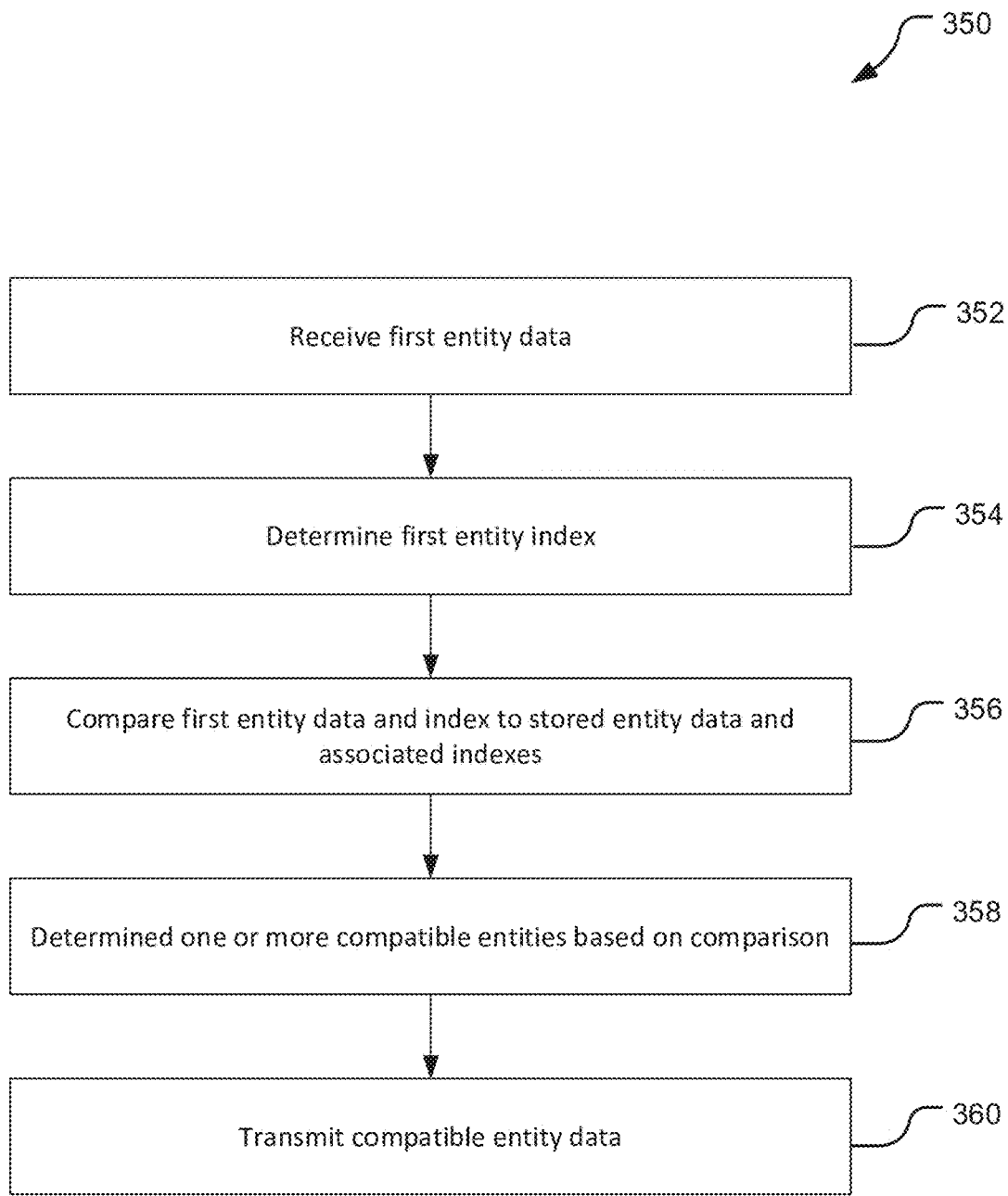
FIG. 6 is a flow chart illustrating a method for linking compatible entities.

FIG. 6 is a flow chart illustrating a method for linking compatible parties with the entity management and indexing system of the present disclosure. The method 350 begins with operation 352 and first entity data and its associated index value is compared to stored entity data and their associated index values. For example, first entity data and its associated index value may be received, determined, and stored by the system with method 150 of FIG. 3. When comparing first entity data to stored entity data similar entity characteristics may be compared. For example, entity sectors, markets, competitors, customers, finances, goals, and the like may be compared respectively.

After operation 352, the method 350 proceeds to operation 354 and one or more compatible entities are determined based on the comparison. For example, as discussed, compatible entities may share the same or similar entity characteristics and may have similar index values. For example, the system may determine entities are compatible when the first entity data and its associated index value matches or is similar to stored entity data and its associated index value(s). For example, as discussed, the first entity may be compatible with a stored entity when one or more of the entities' sector, market, competitors, customers, finances, goals, and the like, match or are similar. For example, companies in computer technology may be compatible. In some embodiments, the system may store compatibility data for different entity characteristics. For example, the system may store a compatibility association between enterprises and startups, certain technology sectors (e.g., computer hardware and software), particular markets, and the like. In these embodiments, the first entity may be compatible with a stored entity when one or more of the entities' characteristics have a stored compatibility association.

Further, as discussed, the first entity may be compatible with a stored entity when the entity index values are the same or similar. For example, entity index values may be the same when the values are identical. As another example, entity index values may be similar when they deviate a particular degree or amount (e.g., by 5%, 10%, 20%, etc.). As yet another example, entity index values may be similar when they are indicative of a similar level of performance and/or growth. For example, an index value indicative of a high performing startup may be similar to an index value indicative of a high performing enterprise, even though the index values may not be the same values or may deviate greatly from one another (e.g., a high performing startup index may be much lower than a high performing enterprise index, yet the two companies may still be considered compatible based on the weighting and scaling incorporated into the indexing system).

After operation 354, the method 350 proceeds to operation 356 and compatible entity data is transmitted to one or more user devices 106a-n. For example, compatible entity data may be stored as part of a user's profile, e.g., for quick retrieval. As another example, compatible entity data may be stored in a database and transmitted to a user device upon request. In this manner, a user may be able to view compatible companies that the user may otherwise not be aware of. Therefore, the indexing system of the present disclosure facilitates entity connections that otherwise might not be made, increasing the efficiency, effectiveness, and transparency of business connections.

Figure 7:
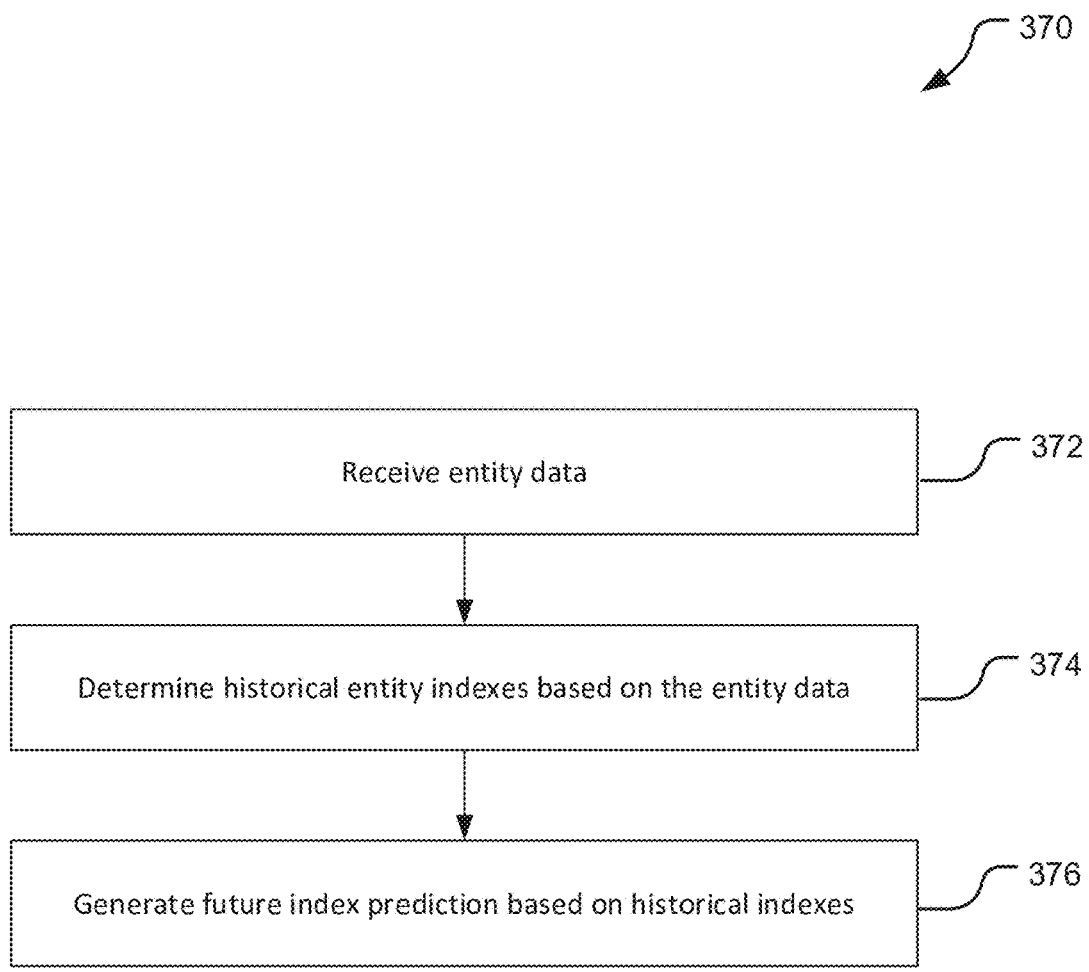
FIG. 7 is a low chart illustrating a method for generating a prediction of a future performance index for an entity.

FIG. 7 is a flow chart for generating a predicted future performance index for an entity. The method 370 begins with an operation 372, which receives entity data. The received entity data may be any entity data or entity information described elsewhere and may be obtained from user input, public or subscription databases, or other data sources. The entity data may also include data from previous years of operation. For example, the entity data may include number of employees, revenue, and investment for multiple years of operation for the entity. The entity data may also include previously calculated indexes for the entity or similar entities.

An operation 374 determines historical entity indexes based on the entity data. A historical entity index may generally be a performance index calculated for a particular year of operation of an entity. The historical entity indexes may include a present entity index. In some implementations, a historical entity index may be calculated for each year of an entity's operation (e.g., over the lifetime of an entity). In some situations, historical entity indexes may be calculated over a set time interval (e.g., a current index and the previous four years) instead of over the life of an entity. Such intervals may be defined based on the time interval covered by the future index prediction. For example, a future index prediction for five years in the future may use more historical data than a future index prediction for the next year.

An operation 376 generates a future index prediction based on historical indexes. The future index prediction may include performance indexes for each of a number of years or may include one future performance index. In some implementations, the future index prediction may be generated using time series analysis and the historical indexes. For example, a curve may be fit to the historical indexes and the future index may be predicted using the curve. Various types of linear or non-linear regression may be used in generating the future index prediction. Other implementations may use trained machine learning models receiving historical indexes or historical data to generate future index predictions.

In some implementations, the future index prediction may be adjusted based on market circumstances. For example, a future index prediction may be generated predicting how the index of an entity would change given a nationwide, worldwide, or industry specific economic downturn. These predictions may take into account performance of the entity during previous similar economic downturns or, where the entity has not experienced such an event, may factor in performance of similarly situated entities, the management team, or a sector or industry during previous similar downturns. For example, in some implementations, a scalar value representing the difference between the expected performance (e.g., theoretical forecasted performance with no downturn) and the actual performance of similarly situated entities in previous downturns may be applied to the index values generated using, for example, equations 2 and 4 above.

As another example, the entity management and indexing system 100 may be used for diligence review. For example, a user can input entity information into the system 100 and use the system 100 to analyze the entity data to determine action areas and areas for diligence focus. As discussed, a user can create an entity profile or account. In this embodiment, a user may create an entity account for the entity under diligence review. For example, through an application on a user device, the user can input information for the entity under review. As discussed, the server can use this entity information to generate an index value for the entity. Based on the index value for the entity, the user can determine areas for improvement, e.g., to improve performance and/or growth ability. In another embodiment, a user can review entity information stored within the system 100 as part of a diligence review process. For example, a user can search, via an application on a user device, for information related to an entity under consideration in the entity management and indexing system database. The focus or extent of diligence review can be determined based on an index value associated with the entity. For example, a low index value may require greater diligence review to assess the reasons for the low index value. As another example, information provided by a company under diligence review can be compared to stored company data and the associated stored company index value stored in the system database to determine whether the company information is accurate. For example, where the company information provided indicates strong company finances but the company index is low (e.g., indicating low performance), then the company information provided may not be accurate, e.g., where a low company index is indicative of poor company finances.

As another example, the entity management and indexing system may be used to facilitate investment opportunities and decisions. For example, an investor may search, via an application on a user device, for startups meeting certain criteria. The server may transmit results for display on the user device (e.g., according to method 300 of FIG. 5) that are organized based on startup index values. The investor may use the index values generated by the system to assess a company's performance and growth relative to other companies. In some instances, an investor may only want to fund companies having a particular level of performance (e.g., a high level of performance). In these instances, an investor may input a preferred index value, range, or threshold as a search criteria into the system to locate companies meeting the investor's performance criteria. The system may analyze stored entity index values to determine companies having the preferred index value, within the preferred index value range, or exceeding the preferred index value threshold. The system may transmit entity data satisfying the investor's preferences to the investor's user device for display. In this manner, an investor may use the system of the present disclosure to locate future investment opportunities.

As yet another example, the entity management and indexing system may be used to evaluate company management. For example, as discussed, a user may enter search criteria into the system via a user device, and the server may analyze stored entity data and transmit to the user device stored entity data satisfying the search criteria (e.g., according to method 300 of FIG. 5). In this manner, a user may search for a particular entity and review data related to the entity, such as, for example, the entity index value. As discussed, the entity index value may correspond to a company's performance level, which may further correspond to the capability of the company's management. For example, a high performing company likely has a highly capable management team. As such, the capability of company management to successfully manage the company can be determined based on the company index generated by the system.

As an additional example, the entity management and indexing system may be used to evaluate vendors, for example during vendor selection or vendor contract extension process. For example, a user may input, via a user device, vendor company criteria into the system, and the server may analyze stored company data and transmit to the user device stored company data satisfying the vendor company criteria (e.g., according to method 300 of FIG. 5). As discussed, the stored company data may be associated with stored company index values determined by the system. The user may review the company index values to assess whether a company can sustain coming years. For example, the entity associated with the user may have large production needs that can only be satisfied by a high performing vendor. In this example, the indexing system can be used as an indicator of vendor performance to assess whether a vendor can meet the entity's needs.

As a further example, the entity management and indexing system may be used for strategic planning for future years by creating benchmarks for a company to obtain. For example, the system may store in a database historical company index data including one or more company index values for the same company previously determined by the system (e.g., by method 150 of FIG. 3) at one or more select periods of time. In other words, the historical index values for the company may cover different periods of operation (e.g., one historical index value may cover the first 2 years of operation, while another historical index value may cover years 3-4). Upon request from a user, the system server may transmit the historical company index data for display on a user device. A user can review the historical company index data to assess past company performance and determine a strategic plan for the future. For example, a trend may be determined from the historical company index data indicative of performance improvement over time. A company may strive to achieve this same performance improvement over the next year or other predetermined amount of time or may aim to achieve even greater performance improvement than historically achieved. In other words, the historical company index data and/or trend information determined therefrom can be used as a benchmark for a company's strategic plan for the future. As another example, the system server may receive a request for company index data for select companies (e.g., competitors, in a particular sector, etc.) and transmit the company index data for display on a user device (e.g., according to method 300 of FIG. 5). In this example, a user may review the user's associated company's index value relative to other company index values to determine a strategic plan to improve the company's performance relative to other companies. For example, a company may plan to achieve a similar, the same, or a greater index value in the next 5 years or other select amount of time as a competitor.

As yet another example, the entity management and indexing system may be used for recruiting. In this example, the system may be accessible by users unaffiliated with a company, e.g., individuals searching for a job. Such users may create individual user profiles on applications on their respective user device. An individual profile may include information that is different from an entity profile. For example, an individual profile may include information about the individual (e.g., name, address, phone number, email, resume, work history, experience, etc.). In some embodiments, an individual user may access the system by entering a username and password on an application on a user device. The individual user may search for a company to work for by inputting one or more company criteria. The server may transmit company data including associated company index values to the user device for display. The individual user may review the company information to determine a company to work for. As one example, the individual user may select a company based on the company index value. In this manner, an entity management and indexing system of the present disclosure provides a centralized location for reviewing, assessing, and comparing information related to entity health.

CONCLUSION

The methods and systems are described herein with reference to companies. However, these techniques are equally applicable to other types of entities. Further, while several examples of uses of a system of the present disclosure are described, other uses are contemplated, e.g., in situations where entity health or comparison of entities is a factor. As such, the discussion of any particular embodiment is meant as illustrative only. Further, features and modules from various embodiments may be substituted freely between other embodiments.

In methodologies directly or indirectly set forth herein, various steps and operations are described in one possible order of operation but those skilled in the art will recognize the steps and operation may be rearranged, replaced or eliminated without necessarily departing from the spirit and scope of the present invention. It is intended that all matter contained in the above description or shown in the accompanying drawings shall be interpreted as illustrative only and not limiting. Changes in detail or structure may be made without departing from the spirit of the invention as defined in the appended claims.

What is claimed is:

1. A method of comparing performance of a first entity and a second entity using performance indexing based on comparable performance metrics, comprising:
   retrieving, by a processor, a first plurality of entity characteristics for the first entity, wherein the first entity is a startup company;
   determining, by the processor, a first entity performance rate for the first entity by determining a ratio of total revenue generated from total funding over time;
   estimating, by the processor, a first growth ability for the first entity based on the first plurality of entity characteristics;
   weighting, by the processor, the first performance rate and the first growth ability based on one or more entity characteristics of the first plurality of entity characteristics;
   determining, by the processor, a first entity index value based on the weighted first performance rate and first growth ability;
   training a machine learning model using a set of historical index data including the first entity index value and associated entity information;
   determining, by the processor, a second entity index value for the second entity by providing a second plurality of entity characteristics for the second entity to the machine learning model;
   generating, by the processor, a comparison between the first entity and the second entity using the first entity index value for the first entity and a second entity index value for the second entity; and
   updating, by the processor, the machine learning model by providing, to the machine learning model, feedback on the second entity index value and entity health of the second entity.

2. The method of claim 1, wherein the second entity index value is generated based on a weighting of a second performance rate of the second entity and a second growth ability of the second entity, wherein the second performance rate and the second growth ability are weighted based on an entity type of the second entity.

3. The method of claim 2, wherein the first entity type is different from the second entity type and wherein the first performance rate and the first growth ability are weighted differently than the second performance rate and the second growth ability.

4. The method of claim 1, wherein estimating growth ability comprises determining the ratio of revenue to number of employees.

5. The method of claim 1, wherein weighting the performance rate comprises executing, by the processor, a logarithmic function on a performance influencing factor.

6. The method of claim 5, wherein the performance influencing factor is the first entity's latest round of funding, and the logarithmic function is to the base 100.

7. The method of claim 1, wherein the first entity index value and the second entity index value are stored in an entity index value list, the entity index value list comprising a plurality of entity index values for diverse companies, wherein the diverse companies' performance abilities are comparable based on the respective entity index value.

8. An entity indexing system for indexing diverse entities based on comparable health metrics, comprising:
   a database storing entity information and associated entity index values, wherein the associated entity index values are comparable indicators of entity health;
   a processing device; and
   a computer readable medium containing programming instructions that, when executed, cause the processing device to:
      receive entity information for a first entity, wherein the first entity is a startup company;
      determine performance rate based on financial data associated with the first entity information by determining a ratio of total revenue generated from total funding over time;
      estimate growth ability based on the financial data and operational data associated with the entity information;
      weight the performance rate and growth ability based on respective performance influencing factors and growth influencing factors associated with the entity information;
      determine a first entity index value for the first entity based on the weighted performance rate and growth ability;
      train a machine learning model using a set of historical index data including the first entity index value and the entity information;
      determine a second entity index value for a second entity by providing second entity information for the second entity to the machine learning model;
      generate a comparison between the first entity and the second entity using the first index value for the first entity and a second entity index value for the second entity; and
      update the machine learning model by providing, to the machine learning model, feedback on the second entity index value and entity health of the second entity.

9. The entity indexing system of claim 8, wherein the performance rate and growth ability are weighted to account for the first entity's operating time.

10. The entity indexing system of claim 8, wherein the performance rate and growth ability are weighted based on the first entity's size.

11. The entity indexing system of claim 8, wherein the programming instructions further cause the processing device to generate a prediction of at least one future entity index value.

12. A method of comparing performance of a first entity and a second entity using performance indexing based on comparable performance metrics, comprising:
   retrieving, by a processor, a first plurality of entity characteristics for the first entity, wherein the first entity is an enterprise;
   determining, by the processor, a first entity performance rate for the first entity by determining a ratio of net income to working capital;

estimating, by the processor, a first growth ability for the first entity based on the first plurality of entity characteristics;

weighting, by the processor, the first performance rate and the first growth ability based on one or more entity characteristics of the first plurality of entity characteristics;

determining, by the processor, a first entity index value based on the weighted first performance rate and first growth ability;

training a machine learning model using a set of historical index data including the first entity index value and associated entity information;

determining, by the processor, a second entity index value for the second entity by providing a second plurality of entity characteristics for the second entity to the machine learning model;

generating, by the processor, a comparison between the first entity and the second entity using the first entity index value for the first entity and a second entity index value for the second entity; and updating, by the processor, the machine learning model by providing, to the machine learning model, feedback on the second entity index value and entity health of the second entity.

13. The method of claim 12, wherein the second entity index value is generated based on a weighting of a second performance rate of the second entity and a second growth ability of the second entity, wherein the second performance rate and the second growth ability are weighted based on an entity type of the second entity.

14. The method of claim 13, wherein the first entity type is different from the second entity type and wherein the first performance rate and first growth ability are weighted differently than the second performance rate and the second growth ability.

15. The method of claim 12, wherein estimating growth ability comprises determining the ratio of revenue to number of employees.

16. The method of claim 12, wherein weighting the performance rate comprises executing, by the processor, a logarithmic function on a performance influencing factor.

17. The method of claim 16, wherein the performance influencing factor is the first entity's equity capital, and the logarithmic function is to the base 10.

18. The method of claim 12, wherein the first entity index value and the second entity index value are stored in an entity index value list, the entity index value list comprising a plurality of entity index values for diverse companies, wherein the diverse companies' performance abilities are comparable based on the respective entity index value.

* * * * *